US010421259B2

(12) United States Patent
Nguyen et al.

(10) Patent No.: US 10,421,259 B2
(45) Date of Patent: Sep. 24, 2019

(54) PERFORATED POLYOLEFIN FILMS

(71) Applicant: Achilles USA, Inc., Everett, WA (US)

(72) Inventors: Bach Nguyen, Everett, WA (US); Vince Dean, Everett, WA (US); Frank He, Everett, WA (US); Anthony R. Elfeghih, Everett, WA (US)

(73) Assignee: Achilles USA, Inc., Everett, WA (US)

( * ) Notice: Subject to any disclaimer, the term of this patent is extended or adjusted under 35 U.S.C. 154(b) by 0 days.

(21) Appl. No.: 15/752,571

(22) PCT Filed: Aug. 19, 2016

(86) PCT No.: PCT/US2016/047731
§ 371 (c)(1),
(2) Date: Feb. 13, 2018

(87) PCT Pub. No.: WO2017/031409
PCT Pub. Date: Feb. 23, 2017

(65) Prior Publication Data
US 2018/0257352 A1 Sep. 13, 2018

Related U.S. Application Data

(60) Provisional application No. 62/207,252, filed on Aug. 19, 2015.

(51) Int. Cl.
| | | |
|---|---|---|
| *B32B 27/32* | (2006.01) | |
| *B29C 48/08* | (2019.01) | |
| *B29C 48/00* | (2019.01) | |
| *B32B 27/08* | (2006.01) | |
| *B32B 3/26* | (2006.01) | |
| *B29C 55/00* | (2006.01) | |
| *C08J 5/18* | (2006.01) | |
| *B29C 48/21* | (2019.01) | |

(52) U.S. Cl.
CPC ........ *B32B 27/327* (2013.01); *B29C 48/0014* (2019.02); *B29C 48/08* (2019.02); *B29C 55/005* (2013.01); *B32B 3/266* (2013.01); *B32B 27/08* (2013.01); *B32B 27/32* (2013.01); *C08J 5/18* (2013.01); *B29C 48/001* (2019.02); *B29C 48/21* (2019.02); *B32B 2274/00* (2013.01); *B32B 2307/406* (2013.01); *B32B 2307/41* (2013.01); *B32B 2307/536* (2013.01); *B32B 2307/546* (2013.01); *B32B 2307/5825* (2013.01); *B32B 2307/732* (2013.01); *B32B 2307/734* (2013.01); *B32B 2307/75* (2013.01); *B32B 2439/70* (2013.01); *C08J 2323/02* (2013.01)

(58) Field of Classification Search
CPC ... B29C 48/0014; B29C 55/005; B29C 48/08; B29C 48/001; B29C 48/21; B32B 27/08; B32B 27/32; B32B 27/327; B32B 2274/00; B32B 2307/406; B32B 2307/41; B32B 2307/536; B32B 2307/546; B32B 2307/5825; B32B 2307/732; B32B 2307/734; B32B 2307/75; B32B 2439/70; C08J 5/18; C08J 2323/02

See application file for complete search history.

(56) References Cited

U.S. PATENT DOCUMENTS

| | | | |
|---|---|---|---|
| 3,125,536 | A | 3/1964 | O'Brien et al. |
| 3,185,650 | A | 5/1965 | Gurnee et al. |
| 3,674,730 | A | 7/1972 | King |
| 3,796,668 | A | 3/1974 | Hickcox |
| 3,915,884 | A | 10/1975 | Kazenas |
| 3,919,158 | A | 11/1975 | Randell et al. |
| 3,936,403 | A | 2/1976 | Sakaguchi et al. |
| 3,937,666 | A | 2/1976 | Schafer et al. |
| 3,987,229 | A | 10/1976 | Rairdon et al. |
| 4,002,702 | A | 1/1977 | Kuhn |
| 4,208,300 | A | 6/1980 | Gravisse |
| 4,211,813 | A | 7/1980 | Gravisse et al. |
| 4,224,379 | A | 9/1980 | Ichinose et al. |
| 4,278,483 | A | 7/1981 | Mansolillo |
| 4,397,905 | A | 8/1983 | Dettmer et al. |
| 4,695,399 | A | 9/1987 | Neefe |
| 4,751,261 | A | 6/1988 | Miyata et al. |
| 4,839,409 | A | 6/1989 | Conroy |
| 5,135,600 | A | 8/1992 | Ishida |
| 5,225,267 | A | 7/1993 | Ochi et al. |
| 5,244,861 | A | 9/1993 | Campbell et al. |
| 5,304,411 | A | 4/1994 | Rusincovitch, Jr. |
| 5,374,377 | A | 12/1994 | Nguyen et al. |
| 5,698,621 | A | 12/1997 | Nguyen et al. |
| 5,759,648 | A | 6/1998 | Idlas |

(Continued)

FOREIGN PATENT DOCUMENTS

| | | |
|---|---|---|
| GB | 627881 A | 8/1949 |
| JP | 52-92260 A | 8/1977 |

(Continued)

OTHER PUBLICATIONS

Printing.org, "Offset Printing on Nonabsorptive Surfaces," retrieved from http://www.printing.org/page/9724, Oct. 2011, 4 pages.

*Primary Examiner* — Nathan M Nutter
(74) *Attorney, Agent, or Firm* — Seed IP Law Group LLP

(57) ABSTRACT

Multi-layer, perforated polyolefin films comprising at least one polyolefin layer having a high visible light absorbance and at least one polyolefin film having a high opacity, a support layer interposed between the first and second layers, a plurality of perforations penetrating from the first and second layers, a shore D hardness of at least (35) and wherein at least one of the first two layer has a surface tension of at least (34) dyne/cm are provided. Methods for preparation and use of the poly olefin films are also provided.

22 Claims, 3 Drawing Sheets

(56) References Cited

U.S. PATENT DOCUMENTS

| | | | |
|---|---|---|---|
| 5,985,426 A | 11/1999 | Wilkie | |
| 5,993,922 A | 11/1999 | Babrowicz et al. | |
| 6,063,466 A | 5/2000 | Tuschy et al. | |
| 2002/0192459 A1 | 12/2002 | Bacon, Jr. | |
| 2005/0196630 A1 | 9/2005 | Carper et al. | |
| 2006/0165958 A1* | 7/2006 | Sankey et al. ............ | B32B 3/10 |
| | | | 428/138 |
| 2007/0251572 A1 | 11/2007 | Hoya et al. | |
| 2008/0171156 A1 | 7/2008 | Olijve et al. | |
| 2011/0123753 A1 | 5/2011 | Koger et al. | |
| 2011/0268966 A1 | 11/2011 | Yun et al. | |
| 2014/0356566 A1 | 12/2014 | Nguyen et al. | |

FOREIGN PATENT DOCUMENTS

| JP | 57-177054 A | 10/1982 |
|---|---|---|
| JP | 58-129029 A | 8/1983 |
| JP | 60-135246 A | 7/1985 |
| JP | 2-234984 A | 9/1990 |

\* cited by examiner

PERFORATED POLYOLEFIN FILMS

BACKGROUND

Field of the Invention

The present invention is generally directed to polyolefin films, perforated films thereof, methods for making the films and methods for use of the same.

Description of the Related Art

Polyvinyl chloride ("PVC") is made by the polymerization and copolymerization of vinyl chloride monomer and other monomers. PVC has been used for a number of years in the manufacture of soft, flexible films for food packaging, in molded rigid products (such as pipes, fibers, upholstery and bristles), and in a variety of other products, including electric wire and cable-coverings, film finishes for textiles, raincoats, belting, gaskets and shoe soles.

PVC films have also been used for forming perforated films for media graphics, which are popular in applications such as store windows and bus windows for blocking certain levels of sun light, while at the same time displaying graphics. Such perforated films allow the light to transmit through at different percentages depending on the number and size of the perforations. These perforated films can be printed on one side to view the print design without showing the shadow of it through the other side. Alternatively, both sides of the film can be printed with different designs, which can be viewed independently without interfering with each other.

Perforated PVC films are typically prepared by laminating multiple layers of films together after the films have been independently prepared by a calendaring or extruding process. The layers typically comprise at least a layer of white and a layer of black, and optionally an additional layer of white. The laminated PVC film is typically perforated to allow a light transmission of around 30 to 75%.

Although perforated PVC films are known, improvements to this technology are needed. For example, current PVC films are environmentally unfriendly, and in order to obtain the tear strength needed for most applications, the PVC films must be relatively thick, thus adding to the cost and environmental waste created. Further, the known processes for preparing perforated films require multiple steps of extruding and laminating, and are not economically efficient.

While progress has been made, there remains a need in the art for perforated films having improved properties and which are prepared from improved materials. Improved methods for preparation of the same are also needed. The present invention provides this and other related advantages.

BRIEF SUMMARY

In brief, the present invention is generally directed to multi-layer, polyolefin films and perforated films thereof. Typically the polyolefin films comprise at least two different polyolefin layers. A first layer will generally have a high visible light absorbance and a low L* value (e.g., under 50, under 40 or under 30) and a second layer will generally have a high opacity and a high L* value (e.g., over 85, over 90 or over 95). In some embodiments, a support layer is interposed between the first and second layers. The support layer can be tailored to provide the desired physical properties to the film. The support layer can be prepared from recycled polyolefin materials, thus reducing the cost and environmental impact of the films. Advantageously, certain embodiments provide polyolefin films wherein at least one outer surface is compatible with commonly used inks, such that the films can be printed with graphics. Further, the films are typically thinner and lighter weight than other known perforated films (e.g., PVC), while still maintaining a high tear strength and hardness.

Accordingly, in one embodiment, the present disclosure provides a polyolefin film having first and second outer surfaces and comprising:

A) a first polyolefin layer forming the first outer surface and having an opacity of at least 80%, as measured by ASTM D-1003, and an L* value of greater than 85;

B) a second polyolefin layer forming the second outer surface and having a visible light absorbance of at least 90% and an L* value of less than 50;

C) a polyolefin support layer interposed between the first and second polyolefin layers;

D) a plurality of perforations penetrating from the first outer surface to the second outer surface; and E) a shore D hardness of at least 35 as measured by ASTM D-2240;

wherein at least at least one of the first or second outer surfaces has a surface tension of at least 34 dyne/cm as measured by ASTM D-2578.

In another embodiment, the disclosure is directed to a polyolefin film having first and second outer surfaces and comprising:

A) a first polyolefin layer forming the first outer surface and having an opacity of at least 80%, as measured by ASTM D-1003, and an L* value of greater than 85;

B) a second polyolefin layer forming the second outer surface and having visible light reflectance of at least 80%, as measured by ASTM D-1003, and an L* value of greater than 85;

C) a third polyolefin layer interposed between the first and second polyolefin layers and having a visible light absorbance of at least 90% and an L* value of less than 50;

D) a plurality of perforations penetrating from the first outer surface to the second outer surface; and E) a shore D hardness of at least 35 as measured by ASTM D-2240;

wherein at least one of the first or second outer surfaces has a surface tension of at least 34 dyne/cm as measured by ASTM D-2578.

Methods for preparation of the disclosed films, and their use in various applications (e.g., displaying graphics), are also provided.

These and other aspects of the invention will be apparent upon reference to the following detailed description. To this end, various references are set forth herein which describe in more detail certain background information, procedures, compounds and/or compositions, and are each hereby incorporated by reference in their entirety.

BRIEF DESCRIPTION OF THE DRAWINGS

In the figures, identical reference numbers identify similar elements. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

Definitions

Figure 1A:
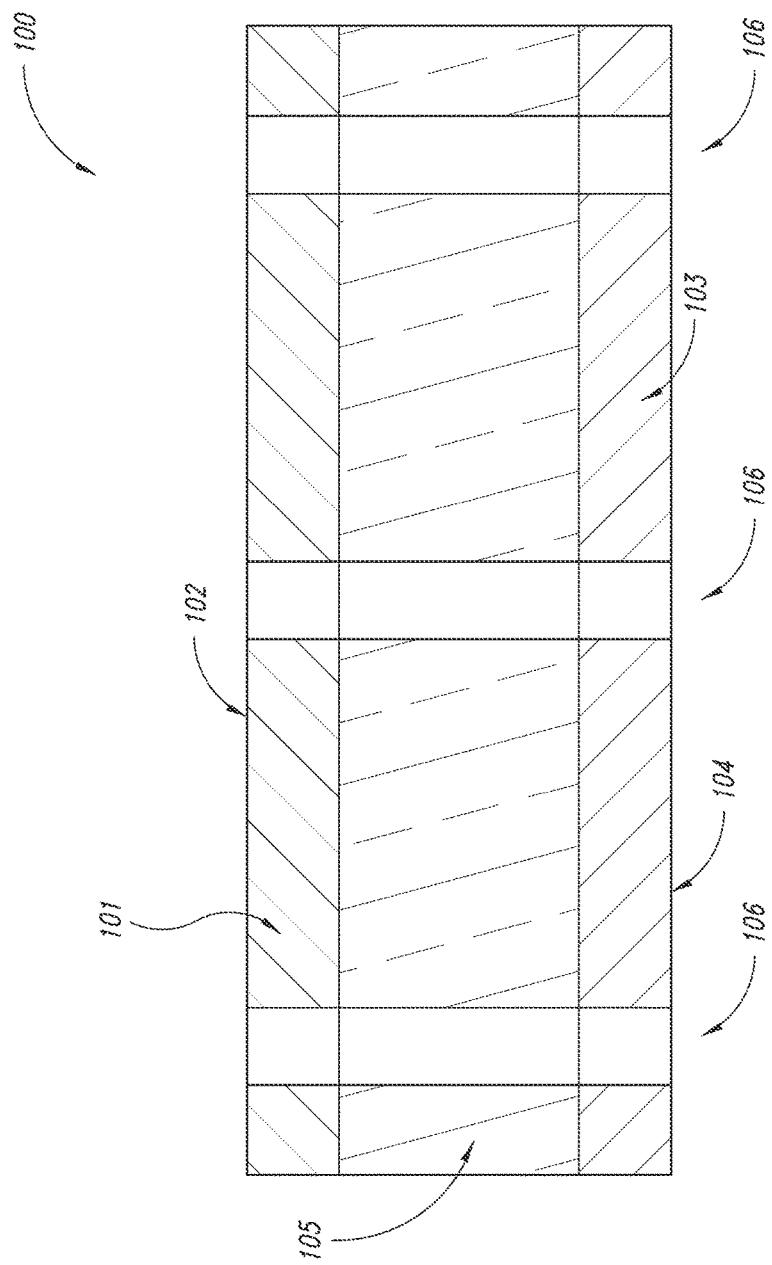
FIG. 1A depicts a multi-layer polyolefin film according to a first embodiment.

In the following description, certain specific details are set forth in order to provide a thorough understanding of various embodiments of the invention. However, one skilled in the art will understand that the invention may be practiced without these details.

Unless the context requires otherwise, throughout the present specification and claims, the word "comprise" and variations thereof, such as, "comprises" and "comprising" are to be construed in an open, inclusive sense, that is, as "including, but not limited to".

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

"Polyolefin" refers to a polymer prepared from one or more olefins. Polyolefins include straight-chain polymers, branched polymers, cross-linked polymers, co-polymers, random co-polymers, block co-polymers and the like. Polyolefins may include optional co-monomers and/or stabilizer(s). Polyolefins also include in-part polymers, for example propylene co-polymerized with rubber (thermoplastic elastomer TPE). Representative polyolefins include, but are not limited to: polyethylene, polypropylene, polybutene, and copolymers thereof. Polyolefins can be prepared specifically for the present films or can be from recycled sources. Natural sources of polyolefins, such as polyolefins obtained from polymerization of from biomass (e.g., sugar cane) components are also contemplated. Unless stated otherwise specifically in the specification, a polyolefin may be optionally substituted.

"Co-monomers" refer to polymer subunits which may be polymerized with other co-monomers to form a polymer. Suitable co-monomers include, but are not limited to, olefins, vinyl acetate, ethylene, propylene, maleate, methacrylate, acrylate, high alcohol vinyl ester, urethane, chlorinated urethane, methylmethacrylate, and mixtures thereof.

"Olefins" are alkyl compounds which contain at least one carbon-carbon double bond. Unless stated otherwise specifically in the specification, an olefin may be optionally substituted.

"Alkyl" refers to a straight or branched hydrocarbon compound consisting solely of carbon and hydrogen atoms, which is saturated or unsaturated (i.e., contains one or more carbon-carbon double and/or triple bonds), having from one to twelve carbon atoms ($C_1$-$C_{12}$ alkyl), preferably one to eight carbon atoms ($C_1$-$C_8$ alkyl) or one to six carbon atoms ($C_1$-$C_6$ alkyl). Representative unsaturated alkyls (e.g. olefins) include, but are not limited to: ethene, propene, butene, pentene, hexene, isoprene and the like. Unless stated otherwise specifically in the specification, an alkyl group may be optionally substituted.

The term "substituted" used herein means any of the above moieties (i.e., polyolefin, olefin and/or alkyl) wherein at least one hydrogen atom is replaced by a bond to a non-hydrogen atoms such as, but not limited to: a halogen atom such as F, Cl, Br, and I; an oxygen atom in groups such as oxo groups (=O), hydroxyl groups (—OH), alkoxy groups (—OR), and ester groups (—C(=O)OR or —OC(=O)R); a nitrogen atom in groups such as amines (—N(R)$_2$) and amides (—N(=O)R), wherein each R is independently a substituted or unsubstituted alkyl radical.

"Optional" or "optionally" means that the subsequently described event of circumstances may or may not occur, and that the description includes instances where said event or circumstance occurs and instances in which it does not. For example, "optionally substituted alkyl" means that the alkyl may or may not be substituted and that the description includes both substituted alkyls and alkyls having no substitution.

A "polymer" refers to a molecule having one or more repeating subunit. The subunits ("monomers") may be the same or different and may occur in any position or order within the polymer. Polymers may be of natural or synthetic origin. The present invention includes various types of polymers, including polymers having ordered repeating subunits, random co-polymers and block co-polymers. Polymers having two different monomer types are referred to as co-polymers, and polymers having three different types of monomers are referred to as terpolymers, and so on.

A "random polymer" refers to a polymer wherein the subunits are connected in random order along a polymer chain. Random polymers may comprise any number of different subunits. In certain embodiments, the polymers described herein are "random co-polymers" or "random co-terpolymers", meaning that the polymers comprise two or three different subunits, respectively, connected in random order. The individual subunits may be present in any molar ratio in the random polymer, for example each subunit may be present in from about 0.1 molar % to about 99.8 molar percent, relative to moles of other subunits in the polymer. In some embodiments, the subunits of a random co-polymer may be represented by the following general structure:

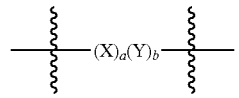

wherein X and Y are independently unique monomer subunits, and a and b are integers representing the number of each subunit within the polymer. For ease of illustration, the above structure depicts a linear connectivity of X and Y; however, it is to be emphasized that random co-polymers (e.g., random co-polymers, random co-terpolymers and the like) of the present invention are not limited to polymers having the depicted connectivity of subunits, and the subunits in a random polymer can be connected in any random sequence, and the polymers can be branched.

A "block co-polymer" refers to a polymer comprising repeating blocks of two or more subunits.

A "thermoplastic polymer" is a polymer is a polymer that becomes pliable or moldable above a specific temperature, and returns to a solid state upon cooling.

A "metallocene polymer" (e.g., metallocene polypropylene) is a polymer prepared by means of a metallocene polymerization catalyst. The exact type of metallocene catalyst used can be selected based on the desired properties of the polymer (e.g., crystalline, amorphous, etc.). Metallocene polymers are well known in the art.

An "impact polymer" is a polymer having high impact resistance. Typically impact polymers will have a lower modulus of elasticity (i.e., less stiff) than non-impact polymers. Exemplary impact polymers include impact polymers comprising polymer chains formed from acrylate, ethylene and/or propylene (or other olefin) monomers. Impact polymers also include certain random polymers as defined above.

A "filler" is a material added to a polymer composition to obtain desired physical characteristics. Fillers are typically inorganic materials, such as calcium carbonate, barium sulfate, talc, magnesium carbonate, and the like. The fillers used herein are typically incorporated in the polymers for increasing and/or optimizing the stiffness or firmness of the polymers.

"Recycled polypropylene" postindustrial polypropylene, meaning that the polypropylene has been previously employed in a consumer context and then re-processed for use in the present films.

"Perforation" refers to a small hole penetrating through a film or other material. Perforations are not limited to circular holes, but also include oval and ellipse shapes as well as triangular, square, rectangular and other polygonal shapes, including regular and irregular polygons. "Perforated' refers to a material, such as a film, having at least one perforation, but more typically a plurality of perforations.

"L* value" refers to the lightness component of lab color space (Color Metric CIEL*a*b*). L* values of the disclosed films are determined according to Color Metric CIEL*a*b*. The darkest black has an L* value of 0, while the brightest white has an L* value of 100. Methods for measuring L* values of the disclosed films according to Color Metric CIEL*a*b* are known in the art.

Polyolefin Films and Uses Thereof

As noted above, the present invention generally provides multilayer polyolefin films useful in a variety of applications. In one particular application, the films are employed as graphic display media, for example in windows of buildings, buses or cars. Embodiments of the disclosed films are perforated which allows a sufficient amount of light penetration such that the viewer can see through the films in one direction without seeing a printed graphic, but when viewed from the other side a graphic is visible (often referred to herein as a "black/white" embodiment). In some embodiments (often referred to herein as a "white/black/white" embodiment), a graphic is printed on both outer surfaces of the films, and both graphics are viewable without interfering with each other.

Certain embodiments of the polyolefin films can be better understood in reference to FIG. 1A. FIG. 1A depicts a cross-sectional view of an exemplary polyolefin film 100 comprising a plurality of perforations 106. In the depicted embodiment, the polyolefin film is shown with three layers. The first layer 101 has an outer surface 102. In some embodiments, the outer surface has a surface tension compatible with standard inks such that graphics can be printed in the outer surface. The first layer in this embodiment will typically have an opacity of at least about 80%, and in some embodiments has an L* value of greater than 85.

The embodiment shown in FIG. 1A also includes a polyolefin layer 103, which includes an outer surface 104. Again, this outer surface may, in some embodiments, have a surface tension compatible with standard inks such that graphics can be printed on the outer surface. Polyolefin layer 103 in some embodiments has a visible light absorbance of at least 90%, and in some embodiments has an L* value of less than 50.

FIG. 1A further depicts a third polyolefin layer 105 interposed between the two outer polyolefin layer 101, 104. In some embodiments, this third polyolefin layer is a support layer which can be tailored to provide the desired properties (e.g., tear strength, hardness, and the like) to the polyolefin film. Advantageously, the support layer can be prepared from recycled materials, thus making embodiments of the polyolefin films more environmentally friendly then other known perforated films.

Figure 1B:
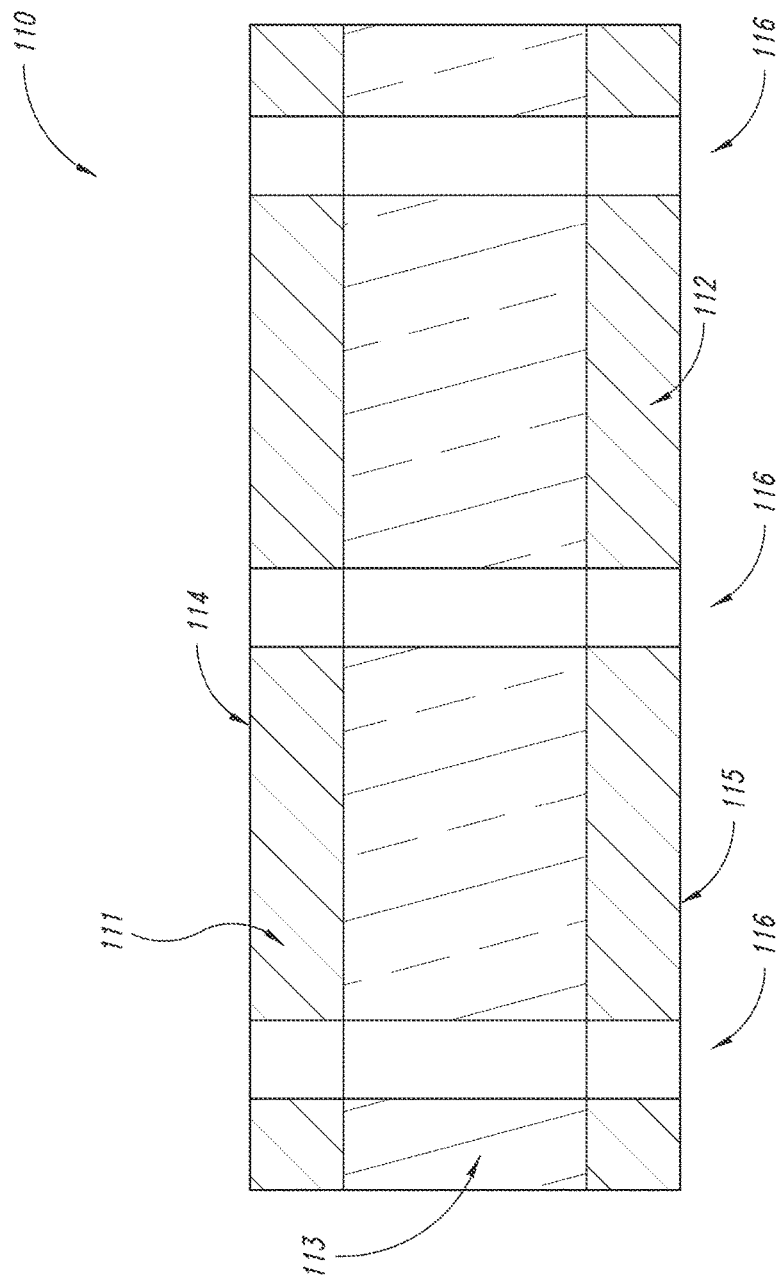
FIG. 1B depicts a multi-layer polyolefin film according to a second embodiment.

FIG. 1B illustrates another exemplary embodiment. As shown in this figure, the polyolefin film again 110 again comprises three layers and a plurality of perforations 116. Different from the embodiment of FIG. 1A, the embodiment of FIG. 1B includes two outer layers 111, 112, each of which independently have an opacity of at least 80%, which in some embodiments independently have an L* value of greater than 85. The middle layer of FIG. 1B 113, has a visible light absorbance of at least 90%, and in some embodiments an L* value of less than 50. Again, the outer surfaces 114, 115 of the polyolefin film each independently comprise a surface tension compatible with standard inks for printing graphics thereon.

For ease of illustration, FIGS. 1A and 1B depict three different layers of polyolefin; however, it is to be noted that the polyolefin films of the invention are generally considered as one continuous film, rather than three separable films. For example, the polyolefin films are generally prepared by co-extrusion of three or more polyolefin compositions as described in more detail below. Accordingly, in some embodiments the resulting film comprises three inseparable layers of polyolefin, and in some embodiments each layer independently has different properties and functions.

Accordingly, in a first embodiment is provided a polyolefin film having first and second outer surfaces and comprising:

A) a first polyolefin layer forming the first outer surface and having an opacity of at least 80%, as measured by ASTM D-1003, and an L* value of greater than 85;

B) a second polyolefin layer forming the second outer surface and having a visible light absorbance of at least 90% and an L* value of less than 50;

C) a polyolefin support layer interposed between the first and second polyolefin layers; and D) a shore D hardness of at least 35 as measured by ASTM D-2240;

wherein at least one of the first or second outer surfaces has a surface tension of at least 34 dyne/cm as measured by ASTM D-2578.

In a related embodiment to the first embodiment is provided a polyolefin film having first and second outer surfaces and comprising:

A) a first polyolefin layer forming the first outer surface and having an opacity of at least 80%, as measured by ASTM D-1003, and an L* value of greater than 85;

B) a second polyolefin layer forming the second outer surface and having a visible light absorbance of at least 90% and an L* value of less than 50;

C) a polyolefin support layer interposed between the first and second polyolefin layers;

D) a plurality of perforations penetrating from the first outer surface to the second outer surface; and E) a shore D hardness of at least 35 as measured by ASTM D-2240;

wherein at least one of the first or second outer surfaces has a surface tension of at least 34 dyne/cm as measured by ASTM D-2578.

In a second embodiment is provided a polyolefin film having first and second outer surfaces and comprising:

A) a first polyolefin layer forming the first outer surface and having an opacity of at least 80%, as measured by ASTM D-1003, and an L* value of greater than 85;

B) a second polyolefin layer forming the second outer surface and having visible light reflectance of at least 80%, as measured by ASTM D-1003, and an L* value of greater than 85;

C) a third polyolefin layer interposed between the first and second polyolefin layers and having a visible light absorbance of at least 90% and an L* value of less than 50; and D) a shore D hardness of at least 35 as measured by ASTM D-2240;

wherein at least one of the first or second outer surfaces has a surface tension of at least 34 dyne/cm as measured by ASTM D-2578.

In a further embodiment of the second embodiment is provided a polyolefin film having first and second outer surfaces and comprising:

A) a first polyolefin layer forming the first outer surface and having an opacity of at least 80%, as measured by ASTM D-1003, and an L* value of greater than 85;

B) a second polyolefin layer forming the second outer surface and having visible light reflectance of at least 80%, as measured by ASTM D-1003, and an L* value of greater than 85;

C) a third polyolefin layer interposed between the first and second polyolefin layers and having a visible light absorbance of at least 90% and an L* value of less than 50;

D) a plurality of perforations penetrating from the first outer surface to the second outer surface; and E) a shore D hardness of at least 35 as measured by ASTM D-2240;

wherein at least one of the first or second outer surfaces has a surface tension of at least 34 dyne/cm as measured by ASTM D-2578.

The thickness of the polyolefin films of either the first or second embodiment can vary depending on the desired end use. Advantageously, the thickness of the films is generally thinner than previously known perforated films, thus allowing for lighter end products and less environmental waste. In one embodiments, the total thickness (i.e., sum of thickness all polyolefin layers) of the polyolefin film ranges from about 75 microns to about 250 microns or from about 150 microns to about 200 microns, for example in some specific embodiments the total thickness of the polyolefin film is about 175 microns. In other embodiments, the total thickness of the polyolefin film ranges from about 160 microns to about 175 microns or from about 160 microns to about 165 microns.

The gloss of the first and second outer surfaces of both the first and second embodiments can be tailored for the desired end use. In some embodiments, at least one of the first or second outer surfaces has a gloss ranging from about 4 to about 100 as measured by ASTM D 2457 60 degree test. Depending on the desired end use, the first and second outer surfaces may have a gloss according to the following:

Matte: gloss of less than about 10, for example about 6;
Satin: gloss ranging from about 18-25, for example about 22;
Luster: gloss ranging from about 45 to about 55, for example about 50; and
Polish: gloss above about 80.

Figure 2:
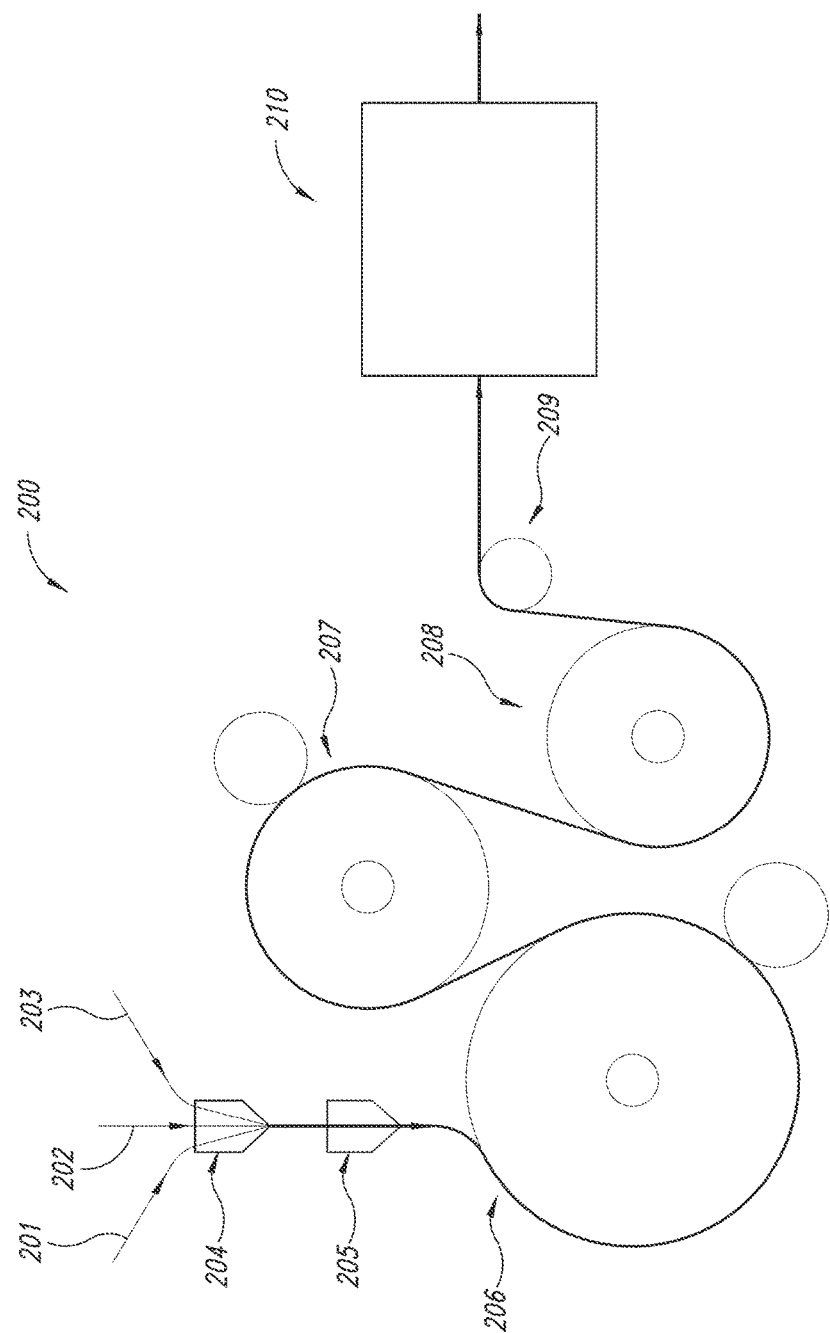
FIG. 2 shows an exemplary process for preparing the polyolefin films.

Gloss can be introduced to a polyolefin film by any number of methods, for example by corona or plasma treatment (see e.g., FIG. 2). The gloss of the polyolefin films can be determined using any number of art-recognized method, for example by use of the BYK gloss meter (ASTM D-2457). In some embodiments, the first or second outer surface has a gloss (as determined by the BYK gloss meter) ranging from about 60 to about 100 gloss units or from about 70 to about 100 gloss units. In other embodiments, the outer surface of the first polyolefin layer has a gloss of greater than about 65 gloss units, greater than about 70 gloss units, greater than about 75 gloss units or greater than about 80 gloss units.

The properties of the outer surfaces of the polyolefin films can also be expressed in terms of surface tension. In certain embodiments, the surface tension of the outer surface of the first polyolefin layer is tailored to be compatible with standard inks. In certain embodiments of any of the first or second embodiments, one of the first or second outer surfaces has a surface tension ranging from about 34 dynes/cm to about 60 dynes/cm as determined by ASTM D 2578. In more embodiments, one of the first or second outer surfaces has a surface tension of at least about 35 dynes/cm as determined by ASTM D 2578. In more embodiments, one of the first or second outer surfaces has a surface tension of at least about 40 dynes/cm as determined by ASTM D 2578. In more embodiments, one of the first or second outer surfaces has a surface tension of at least about 45 dynes/cm as determined by ASTM D 2578. In more embodiments, one of the first or second outer surfaces has a surface tension of at least about 48 dynes/cm as determined by ASTM D 2578. In still other embodiments, one of the first or second outer surfaces has a surface tension of at least about 38 dynes/cm as determined by ASTM D 2578.

Advantageously, the surface tension of the outer surfaces of the polyolefin films remains relatively high, even after prolonged storage. For example, in some embodiments, the foregoing values of surface tension are measured at least 3 months or at least 6 months after manufacture of the polyolefin films, when the polyolefin films have been stored at, or around, room temperature.

The opacity or light transmission of the various layers within the polyolefin films is a property which can be varied depending on the desired end use. In some embodiments of the first embodiment, the first polyolefin layer has an opacity of at least 90%, at least 95% or at least 99%. In other embodiments of the first embodiment, the second polyolefin layer has a visible light absorbance of at least 95%, at least 97% or at least 99%.

In other embodiments of the first embodiment, the first polyolefin layer has an L* value of greater than 90% or greater than 95%, for example about 90%. In other embodiments of the first embodiment, the second polyolefin layer has an L* value of less than 40 or less than 30 or less than 25, for example about 30.

In embodiments of the second embodiment, the first and second polyolefin layer independently have an opacity of at least 90%, at least 95% or at least 99%. In still different embodiments of the second embodiment, the third polyolefin layer has a visible light absorbance of at least 95%, at least 97% or at least 99%.

In other embodiments of the second embodiment, the first and second polyolefin layer independently have an L* value of greater than 90% or greater than 95%, for example about 90%. In other embodiments of the second embodiment, the third polyolefin layer has an L* value of less than 40 or less than 30 or less than 25, for example about 30.

The hardness of the polyolefin films provides for ease of perforation during the manufacturing process and results in a film having a higher tear strength (relative to thickness) than other known perforated films. In some embodiments of the first or second embodiment, the shore D hardness of the polyolefin film ranges from about 39 to about 58, for example in some embodiments the shore D hardness is about 46.

The polyolefin films can comprise any number of different polyolefins and other additives to obtain the desired properties. In different embodiments of the first embodiment the first polyolefin layer comprises from 45 to 85% of a homo-polypropylene, from 0 to 30% of an impact polypropylene and from 3 to 13% of a linear low density polyethylene (LLDPE), for example about 65% of a homo-polypropylene, about 5% of an impact polypropylene and about 8% of a linear low density polyethylene (LLDPE). In other embodiments of the first embodiment, the second polyolefin layer comprises from 75 to 95% of a homo-polypropylene and from 0 to 30% of an impact polypropylene, for example about 85% of a homo-polypropylene and about 5% of an impact polypropylene.

In some embodiments of the second embodiment, the first and second polyolefin layer independently comprise from 45 to 85% of a homo-polypropylene, from 0 to 30% of an impact polypropylene and from 3 to 13% of a linear low density polyethylene (LLDPE). For example, in more specific embodiments of the second embodiment the first and second polyolefin layer independently comprise about 65% of a homo-polypropylene, about 5% of an impact polypropylene and about 8% of a linear low density polyethylene (LLDPE). In still more embodiments, the third polyolefin layer comprises from 75 to 95% of a homo-polypropylene and from 0 to 30% of an impact polypropylene, for example about 85% of a homo-polypropylene and about 5% of an impact polypropylene.

In certain other embodiments, the polyolefin films comprise a random polymer. In some embodiments, the polyolefin films comprise an impact polymer, for example a random impact polymer. Such impact polymers include polymers prepared from acrylate, ethylene and or propylene monomers.

In some embodiments polyolefin films comprise a cross-linked polyolefin (e.g., inter-polymer cross-links). In other embodiments, the polyolefin films comprise ethylene-propylene rubber (EPDM) and a polypropylene homopolymer. In other embodiments, the polyolefin films comprise a thermoplastic polyolefin polymer. In still more embodiments, the polyolefin films comprise a copolymer of a polyolefin and rubber. Metallocene polymers, such as metallocene polypropylene polymers, are also employed in certain embodiments of the invention.

In some embodiments, the support layer comprises a low density polyethylene. Advantageously, the support polyolefin layer may also comprise recycled polyolefin material, thus reducing the cost and environmental impact of the polyolefin films. Accordingly, in some embodiments, the support layer comprises recycled polyolefin, for example up to about 30% recycled polyolefin. Support layers optionally comprising filler materials for optimization of the physical properties (e.g., stiffness and the like) of the support layer are also provided. For example, in some embodiments the support layer comprises a filler. The filler may be present in up to about 70% by weight of the support layer, for example from about 50% to about 60% by weight. Exemplary fillers include, but are not limited to $CaCO_3$, clay, $BaSO_4$, talc and $MgCO_3$. In certain specific embodiments, the filler is $CaCO_3$.

The polyolefin layers may be provided in any number of colors or tints, or may be opaque. For example, in some embodiments, one or more of the polyolefin layers includes an additive (i.e., dye) which imparts a white color to the support layer. In some other embodiments, one or more of the polyolefin layers includes an additive (i.e., dye) which imparts a black color to the support layer. The additives are added in an amount suitable to obtain the desired L* value of the individual polyolefin layers.

The thickness of each of the polyolefin layers can be independently varied. Typically, the support layer will be the thickest of the three layers, with the first and second layers occupying a minority of the total thickness of the film. In certain embodiments, the thickness of the first polyolefin layer ranges from about 5% to about 15% of the total thickness of the polyolefin film, for example about 10%. In other embodiments, the thickness of the second polyolefin layer ranges from about 1% to about 10% of total thickness of the polyolefin film, for example about 5%. In other related embodiments, the thickness of the polyolefin support layer ranges from about 80% to about 90% of the total thickness of the polyolefin film, for example about 85%.

In some embodiments of the first embodiment, the sum of the thickness of the first polyolefin layer and the thickness of the support layer ranges from about 70-90% of the total thickness of the polyolefin film.

In other embodiments of the second embodiment, the sum of the thickness of the first polyolefin layer and the thickness of the support layer ranges from about 70-90% of the total thickness of the polyolefin film.

In some embodiments, the support layer comprises from 40-60% of the total thickness of the polyolefin film, for example about 50%. The support layer may be a single layer, or in some embodiments the support layer comprises a plurality of layers. For example, in some embodiments the support layer comprises two or three layers, for example three. In such embodiments, each layer of the support layer can be comprised of the same polyolefin or different polyolefins. In some embodiments, the support layer comprises three layers, for example such support layers may comprise from 40-60% of the total thickness of the polyolefin film, wherein a first support layer comprises 35-45% of the total thickness of the polyolefin film and the second and third support layers comprise from 1-10% of the total thickness of the polyolefin film.

Certain physical properties of the films may be desirous depending on the desired end use of the films. For example, improved perforation and/or printability may be achieved by optimizing properties of the films. Accordingly, in some embodiments the polyolefin films comprise a Young's modulus ranging from about 10,000 to 60,000 PSI, from 20,000 to 60,000 PSI, from 30,000 to 60,000 PSI, from 40,000 to 60,000 PSI, from 45,000 to 55,000 PSI, from 20,000 to 40,000 PSI or from 20,000 to 35,000 PSI. In some embodiments, the range of Young's modulus is the Young's Modulus for the machine direction. In some embodiments, the range of Young's modulus is the Young's Modulus for the transverse direction. In some of the foregoing embodiments, the range of Young's modulus includes the Young's Modulus for both the machine direction and transverse direction. Young's modulus can be determined according to methods known in the art, for example in some embodiments the above values are determined according to ASTM D-882.

In other embodiments, the Elmendorf tear of the polyolefin film ranges from about 100 to about 2,500 GF, from 100 to 1,000 GF, from 100 to 500 GF, from 150 to 450 GF or from 1,000 to 2,500 GF. In some embodiments, the range of Elmendorf tear is the Elmendorf tear for the machine direction. In some embodiments, the range of Elmendorf tear is the Elmendorf tear for the transverse direction. In some of the foregoing embodiments, the range of Elmendorf tear includes the Elmendorf tear for both the machine direction and transverse direction. Elmendorf tear can be determined according to methods known in the art, for example in some embodiments the above values are determined according to ASTM D-1922.

In other embodiments, the Graves tear of the polyolefin film ranges from about 3 to about 10 lb, 5 to 10 lb, 6 to 10 lb, 7 to 10 lb, 7 to 9 lb or 4 to 5 lb. In some embodiments, the range of Graves tear is the Graves tear for the machine direction. In some embodiments, the range of Graves tear is the Graves tear for the transverse direction. In some of the foregoing embodiments, the range of Graves tear includes the Graves tear for both the machine direction and transverse direction. Graves tear can be determined according to methods known in the art, for example in some embodiments the above values are determined according to ASTM D-1004.

The polyolefin for use in the polyolefin films can be selected from any number of structurally different polyolefins. In certain embodiments, at least one of the polyolefin layers comprises polypropylene. In other embodiments, each of the polyolefin layers, comprise polypropylene. In various other embodiments, the various layers each comprise the same polyolefin (e.g., polypropylene) but the polyolefin in each layer may independently comprise additional additives (stabilizers, etc.) and/or co-monomers (e.g., ethylene and the like) such that the independent layers have the desired properties.

The polyolefin films may also include additional additives, such as anti-static agents, anti-fogging agents, ultraviolet inhibitors, anti-oxidants, light stabilizers, fire retardants, pigments, antiblock agents (e.g., diatomaceous earth, silica, calcium carbonate), slip agents, nucleating agents and mixtures thereof. These additives are generally known in the art and may be present in the films in an amount sufficient to impart the desired property (generally below about 10% w/w.

Anti-static and anti-fogging agents include sorbitan fatty ester, sorbitol fatty ester, glycerine fatty ester, diglycerine fatty ester, diglycerine fatty dibasic ester and glycerine fatty dibasic ester (often in combination with ethylene oxide, propylene oxide, butylene oxide and other alkene oxides). For example, the following commercial compounds may serve as anti-static and anti-fogging agents: sorbitan palmitate, sorbitan stearate, sorbitan stearate-ethylene oxide (2 mol.), sorbitan stearate-propylene oxide (3 mol.), sorbitol stearate, sorbitol stearate-propylene oxide (3 mol.), diglycerine palmitate, diglycerine stearate, glycerine stearate, glycerine palmitate-ethylene oxide (2 mol.), sorbitan stearate-adipate-ethylene-ethylene oxide (3 mol.), sorbitol stearate-adipate-ethylene oxide (2 mol), diglycerine-palmitate-sebacate-propylene oxide (3 mol.), sorbitol palmitate-adipate (3 mol.), and mixtures thereof.

Ultraviolet inhibitors and light/heat stabilizers include hydroquinone disalicylates and phenyl salicylate, paraoctyl-phenylsalicylate, 2,2'-hydroxy-4-methoxy benzophenone, 2,2'-hydroxy-4,4'-dimethoxy benzo-phenone, 2-(2'-hydroxy-5'-methylphenyl)benzyltriazol, 2-(2'-hydroxy-5'-methylphenyl)-5,6-dichlorobenzyltriazol, cyanoacrylate, and mixtures thereof. Anti-oxidants include phenols, thiopropanoates and fatty sulfites, and mixtures thereof. Light stabilizers include 4-(phenyllacetoxy)-2,2,6,8,-tetrametylpiperazine, tris-(2,2,6,6,-tetramethyl-4-piperazyl) triazine-2,4,6-tricarboxylates, and mixtures thereof.

Preparation of the Polyolefin Films

The films can be prepared using casting techniques. Such methods are included within the scope of embodiments of the invention. FIG. 2 illustrates an exemplary procedure 200 for preparation of the films. Briefly, polyolefin compositions 201, 202, 203 are added to extrusion system 204. The polyolefin compositions can be purchased from commercial sources or prepared according to polymerization techniques known in the art. The polyolefin compositions are co-extruded through extrusion die 205 onto casting roll 206. The cast film is generally passed over one or more cooling rolls 207, 208 before being passed to take off roll 209. The surface of the polyolefin films can be tailored to the desired end application. For example, after preparing the films according to the above described extrusion/casting process, a surface of the films (e.g., the first and/or second outer surface) can be treated to obtain the desired gloss and/or surface tension. Such treatment includes corona or plasma treatment or other techniques known in the art. As shown in FIG. 2, the cast film can be passed through a corona and/or plasma treatment station 210 to impart the desired surface tension on the first and/or second outer surfaces.

The films are perforated according to methods known in the art, for example by punch roller embossing or table template pressing. The density of perforations in the film can vary depending on the desired light transmittance. For example in some embodiments, the films are perforated such that from about 20% to about 50% of the film surface area is occupied by perforations. In some exemplary embodiments, perforations occupy from about 30% to about 40% of the film surface area.

Accordingly, in one embodiment the present disclosure provides a method for preparing the disclosed polyolefin films, the method comprising:

A) co-extruding first, second and third polyolefin compositions onto a die head block;

B) casting the co-extruded mixture to obtain the polyolefin film; and

C) subjecting the polyolefin film to corona or plasma treatment thereby obtaining a polyolefin film having at least one outer surface having a surface tension of at least 34 dyne/cm as measured by ASTM D-2578.

The polyolefin films may be printed with various designs or lettering by known techniques to obtain films comprising graphics thereon. Inks which find particular application to the films of the present invention are oil-, alcohol-, water- and solvent-based inks. Standard printing methods include Flexo, Offset, Screen and Gravure (see Technical Guide Book of the Screen Printing Industry, SPAI (Screen Printing Association Int'l) pub., Section K6, pp. 1-4, 1984) (incorporated herein by reference in its entirety).

The following examples are provided to illustrate selected embodiments of the invention and are not to be construed as limiting its scope.

EXAMPLES

Example 1

A black/white polyolefin film was prepared according to the above described general procedures. The film was tested and found to have the following properties:

TABLE 1

Properties of a Representative Polyolefin Film

| Property | Result* |
|---|---|
| Average gauge | 6.7 mil |
| Young's Modulus | 53,880 PSI (MD) |
| (ASTM D-882) | 49,290 PSI (TD) |
| Secant Modulus at 1% | 85 KSI (MD) |
| (ASTM D-882) | 71 KSI (TD) |
| Elongation | 1,110% (MD) |
| (ASTM D-882) | 1,100% (TD) |
| Tensile Strength | 4,960 PSI (MD) |
| (ASTM D-882) | 4,160 PSI (MD) |
| Stress at 100% | 2,320 PSI (MD) |
| (ASTM D-882) | 2,140 PSI (TD) |
| Elmendorf Tear | 180 GF (MD) |
| (ASTM D-1922) | 419 GF (TD) |
| Graves Tear | 9.1 LB (MD) |
| (ASTM D-1004) | 7.8 LB (TD) |
| Surface Tension | 41 dynes (first outer surface) |
| (ASTM D-2578) | 40 dynes (second outer surface) |
| Gloss | 61.7 (first outer surface) |
| (ASTM D-2457) | 54.1 (second outer surface) |
| Dimensional Stability | −0.4 (MD) |
| (ASTM D-1294 10 min @ 100° C.) | −0.4 (TD) |

*"MD" indicates measurement was taken in the machine direction (i.e., the direction in which the film is passed through the casting rolls). "TD" indicates measurement was taken in the direction transverse to the machine direction.

Example 2

A black/white polyolefin film and PVC film were prepared according to the above described general procedures, and their properties tested and compared as set forth in Table 1.

TABLE 2

Properties of Representative Polypiefin Film and a Polyvinyl Chloride Film

| Property | Polyvinyl Chloride* | Polyolefin* |
|---|---|---|
| Average gauge | 7.07 mil | 6.4 mil |
| Young's Modulus | 9,100 PSI (MD) | 57,300 PSI (MD) |
| (ASTM D-882) | 10,290 PSI (TD) | 48,050 PSI (TD) |
| Elongation | 329% (MD) | 1,220% (MD) |
| (ASTM D-882) | 347% (TD) | 1,110% (TD) |
| Tensile Strength | 3,840 PSI (MD) | 5,350 PSI (MD) |
| (ASTM D-882) | 3,300 PSI (MD) | 4,020 PSI (MD) |
| Elmendorf Tear | 517 GF (MD) | 275 GF (MD) |
| (ASTM D-1922) | 1,024 GF (TD) | 345 GF (TD) |
| Graves Tear | 3.91 LB (MD) | 7.2 LB (MD) |
| (ASTM D-1004) | 3.21 LB (TD) | 6.5 LB (TD) |
| Surface Tension | 33 dynes (first outer surface) | 41 dynes (first outer surface) |
| (ASTM D-2578) | 33 dynes (second outer surface) | 41 dynes (second outer surface) |
| Dimensional Stability | −8.3 (MD) | −0.4 (MD) |
| (ASTM D-1294 10 min @ 100° C.) | 0.4 (TD) | 0.4 (TD) |

*"MD" indicates measurement was taken in the machine direction (i.e., the direction in which the film is passed through the casting rolls). "TD" indicates measurement was taken in the direction transverse to the machine direction.

The data in Table 2 provide evidence that the polyolefin films according to embodiments of the invention are superior to polyvinyl chloride films in a number of aspects. For example, the polyolefin film has better dimensional stability, tensile strength, elongation and graves tear properties than polyvinyl chloride. Further, the polyolefin films have a surface tension more suitable for printing with inks. Accordingly, the polyolefin films according to embodiments of the invention are superior to polyvinyl chloride films for use as perforated films, optionally included printed graphics.

Example 3

For comparative purposes, two black/white polyolefin films (A and B) were prepared according to the above described general procedures. The films was tested and found to have the following properties:

TABLE 3

Comparative Properties of two Representative Polyolefin Films

| Property | Film A* | Film B* |
|---|---|---|
| Average gauge | 6.7 mil | 6.8 mil |
| Young's Modulus | 53,880 PSI (MD) | 30,098 PSI (MD) |
| (ASTM D-882) | 49,290 PSI (TD) | 24,879 PSI (TD) |
| Elongation | 1,110% (MD) | 1,118% (MD) |
| (ASTM D-882) | 1,100% (TD) | 1,177% (TD) |
| Tensile Strength | 4,960 PSI (MD) | 4,005 PSI (MD) |
| (ASTM D-882) | 4,160 PSI (MD) | 3,400 PSI (MD) |
| Elmendorf Tear | 180 GF (MD) | 981 GF (MD) |
| (ASTM D-1922) | 419 GF (TD) | 2,030 GF (TD) |
| Graves Tear | 9.1 LB (MD) | 4.74 LB (MD) |
| (ASTM D-1004) | 7.8 LB (TD) | 4.62 LB (TD) |
| Surface Tension | 41 dynes (first outer surface) | 38 dynes (first outer surface) |
| (ASTM D-2578) | 40 dynes (second outer surface) | 38 dynes (second outer surface) |
| Dimensional Stability | −0.4 (MD) | −0.4 (MD) |
| (ASTM D-1294 10 min @ 100° C.) | −0.4 (TD) | −0.4 (TD) |

*"MD" indicates measurement was taken in the machine direction (i.e., the direction in which the film is passed through the casting rolls). "TD" indicates measurement was taken in the direction transverse to the machine direction.

It was found that, for certain embodiments, film A was easier to handle and more effectively perforated than film B. Without wishing to be bound by theory, it is believed the difference in handling and perforation properties results from the difference in Young's Modulus and Elmendorf Tear, respectively.

All of the U.S. patents, U.S. patent application publications, U.S. patent applications, foreign patents, foreign patent applications and non-patent publications referred to in this specification or application data sheet are incorporated herein by reference, in their entirety to the extent not inconsistent with the present description.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A polyolefin film having first and second outer surfaces and comprising:
   A) a first polyolefin layer forming the first outer surface and having an opacity of at least 80%, as measured by ASTM D-1003, and an L* value of greater than 85;
   B) a second polyolefin layer forming the second outer surface and having a visible light absorbance of at least 90% and an L* value of less than 50;
   C) a polyolefin support layer interposed between the first and second polyolefin layers;
   D) a plurality of perforations penetrating from the first outer surface to the second outer surface; and E) a shore D hardness of at least 35 as measured by ASTM D-2240;

wherein at least one of the first or second outer surfaces has a surface tension of at least 34 dyne/cm as measured by ASTM D-2578.

2. The polyolefin film of claim 1, wherein the total thickness of the polyolefin film ranges from about 160 microns to about 175 microns.

3. The polyolefin film of claim 1, wherein at least one of the first or second outer surfaces has a gloss ranging from about 4 to about 100 as measured by ASTM D 2457 60 degree test.

4. The polyolefin film of claim 1, wherein the first polyolefin layer has an opacity of at least 95%.

5. The polyolefin film of claim 1, wherein the first polyolefin layer has an opacity of at least 99%.

6. The polyolefin film of claim 1, wherein the second polyolefin layer has a visible light absorbance of at least 97%.

7. The polyolefin film of claim 1, wherein the second polyolefin layer has a visible light absorbance of at least 99%.

8. The polyolefin film of claim 1, wherein the shore D hardness ranges from about 39 to about 58.

9. The polyolefin film of claim 1, wherein the shore D hardness is about 46.

10. The polyolefin film of claim 1, wherein at least one of the first or second outer surfaces has a surface tension ranging from 34 dyne/cm to 60 dyne/cm as measured by ASTM D-2578.

11. The polyolefin film of claim 1, wherein at least one of the first or second outer surfaces has a surface tension of at least 48 dyne/cm as measured by ASTM D-2578.

12. The polyolefin film of claim 1, wherein the surface tension is measured after the polyolefin film has been stored for at least 6 months at room temperature.

13. The polyolefin film of claim 1, wherein the outer surface of the first polyolefin layer has a surface tension of about 38 dynes/cm as determined by ASTM D 2578.

14. The polyolefin film of claim 1, wherein the first polyolefin layer comprises from 45 to 85% of a homo-polypropylene, from 0 to 30% of an impact polypropylene and from 3 to 13% of a linear low density polyethylene (LLDPE).

15. The polyolefin film of claim 14, wherein the first polyolefin layer comprises about 65% of a homo-polypropylene, about 5% of an impact polypropylene and about 8% of a linear low density polyethylene (LLDPE).

16. The polyolefin film of claim 1, wherein the second polyolefin layer comprises from 75 to 95% of a homo-polypropylene and from 0 to 30% of an impact polypropylene.

17. The polyolefin film of claim 16, wherein the second polyolefin layer comprises about 85% of a homo-polypropylene and about 5% of an impact polypropylene.

18. The polyolefin film of claim 1, wherein the sum of the thickness of the first polyolefin layer and the thickness of the support layer ranges from about 70-90% of the total thickness of the polyolefin film.

19. The polyolefin film of claim 1, wherein the first polyolefin layer has an L* value of greater than 95.

20. The polyolefin film of claim 1, wherein the second polyolefin layer has an L* value of less than 40.

21. A polyolefin film having first and second outer surfaces and comprising:
A) a first polyolefin layer forming the first outer surface and having an opacity of at least 80%, as measured by ASTM D-1003, and an L* value of greater than 85;
B) a second polyolefin layer forming the second outer surface and having a visible light reflectance of at least 80%, as measured by ASTM D-1003, and an L* value of greater than 85;
C) a third polyolefin layer interposed between the first and second polyolefin layers and having a visible light absorbance of at least 90% and an L* value of less than 50;
D) a plurality of perforations penetrating from the first outer surface to the second outer surface; and
E) a shore D hardness of at least 35 as measured by ASTM D-2240;
wherein at least one of the first or second outer surfaces has a surface tension of at least 34 dyne/cm as measured by ASTM D-2578.

22. A method for preparing the polyolefin film of claim 1, the method comprising:
A) co-extruding first, second and third polyolefin compositions onto a die head block;
B) casting the co-extruded mixture to obtain the polyolefin film; and
C) subjecting the polyolefin film to corona or plasma treatment thereby obtaining a polyolefin film having at least one outer surface having a surface tension of at least 34 dyne/cm as measured by ASTM D-2578.

* * * * *